United States Patent [19]
Scheiber et al.

[11] Patent Number: 5,197,929
[45] Date of Patent: Mar. 30, 1993

[54] DRIVE SHAFT

[75] Inventors: Friedrich Scheiber, Tiefenbach; Waldemar Bier, Passau; Hermann Sonnleitner, Hauzenberg; Karl Kühner; Albrecht Lommel, both of Friedrichshafen, all of Fed. Rep. of Germany

[73] Assignee: Zahnradfabrik Friedrichshafen AG, Fed. Rep. of Germany

[21] Appl. No.: 752,635

[22] PCT Filed: Apr. 5, 1990

[86] PCT No.: PCT/EP90/00536

§ 371 Date: Aug. 26, 1991

§ 102(e) Date: Aug. 26, 1991

[87] PCT Pub. No.: WO90/11907

PCT Pub. Date: Oct. 18, 1990

[30] Foreign Application Priority Data

Apr. 8, 1989 [DE] Fed. Rep. of Germany ....... 3911518

[51] Int. Cl.[5] ........................................... F16H 1/40
[52] U.S. Cl. .................................. 475/160; 74/606 A
[58] Field of Search .................... 475/159, 160, 161; 74/606 A

[56] References Cited

U.S. PATENT DOCUMENTS

| | | | |
|---|---|---|---|
| 1,760,356 | 5/1930 | Harper | 184/13.1 |
| 1,775,623 | 9/1930 | Morgan | 475/160 X |
| 1,966,434 | 7/1934 | Barker | 475/160 X |
| 2,147,145 | 2/1939 | Carlson et al. | 475/160 X |
| 2,147,146 | 2/1939 | Carlson et al. | 475/160 X |
| 3,182,527 | 5/1965 | Bryan | 475/160 |
| 3,847,249 | 11/1974 | Oehring | 184/6.12 |
| 4,352,301 | 10/1982 | Fleury | 475/160 X |
| 4,391,351 | 7/1983 | Jirousek et al. | 188/18 A |
| 4,468,981 | 9/1984 | Ries | 475/159 X |

FOREIGN PATENT DOCUMENTS

| | | | |
|---|---|---|---|
| 0058107 | 1/1982 | European Pat. Off. | |
| 0076387 | 9/1982 | European Pat. Off. | |
| 0151387 | 8/1985 | European Pat. Off. | 475/160 |
| 1047820 | 8/1954 | Fed. Rep. of Germany | |
| 2535254 | 11/1982 | France | |
| 590867 | 4/1945 | United Kingdom | |
| 989280 | 2/1963 | United Kingdom | |

Primary Examiner—Dirk Wright
Attorney, Agent, or Firm—Davis, Bujold & Streck

[57] ABSTRACT

The invention concerns a drive shaft (1) having gear heads (9) in each one of which is mounted a liquid-cooled disc brake (19) and a planetary gear (18). In order to improve the cooling of the disc brakes (19), collection and guide elements (32) are coordinated with the bevel wheel (11) of a differential gear (12). The collection and guide elements (32) can consist of a trap (41) or of strippers (49, 50). A shifting of coolant in the gear heads (9) takes place during operation. The object of the invention is applied in particular to heavy utility vehicles such as wheel loaders where the disc brakes (19) are used frequently and must be reliably cooled.

20 Claims, 4 Drawing Sheets

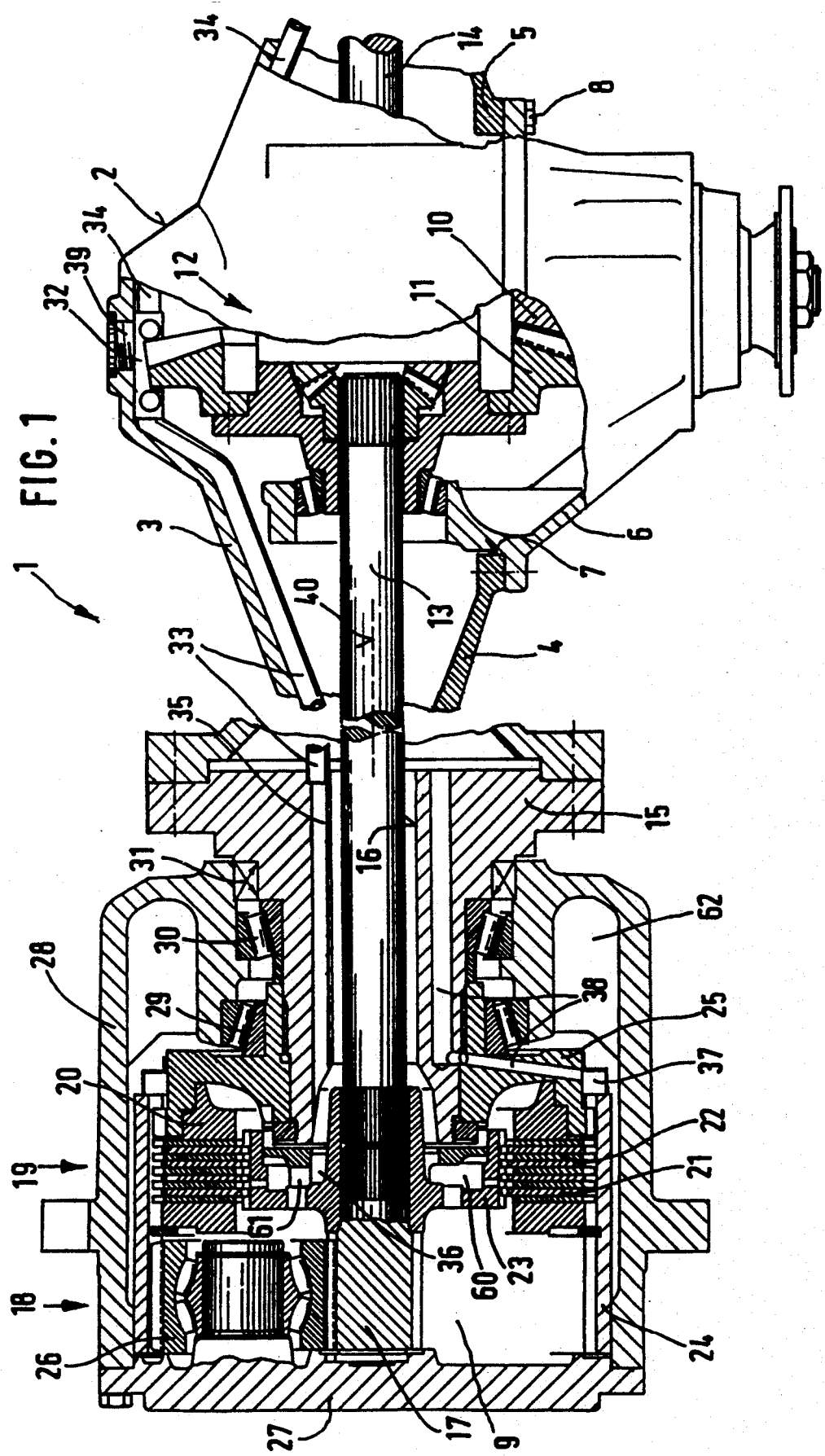

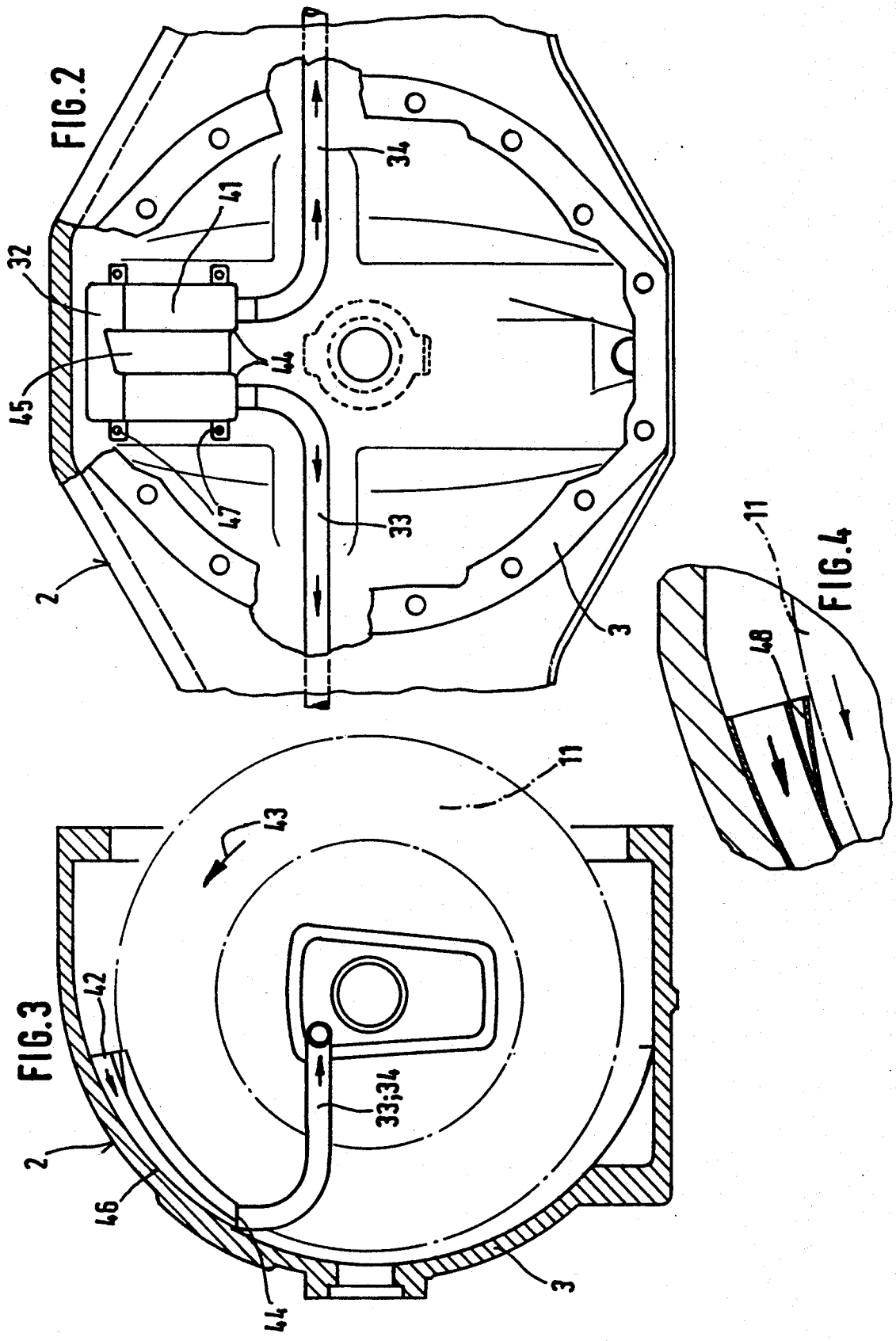

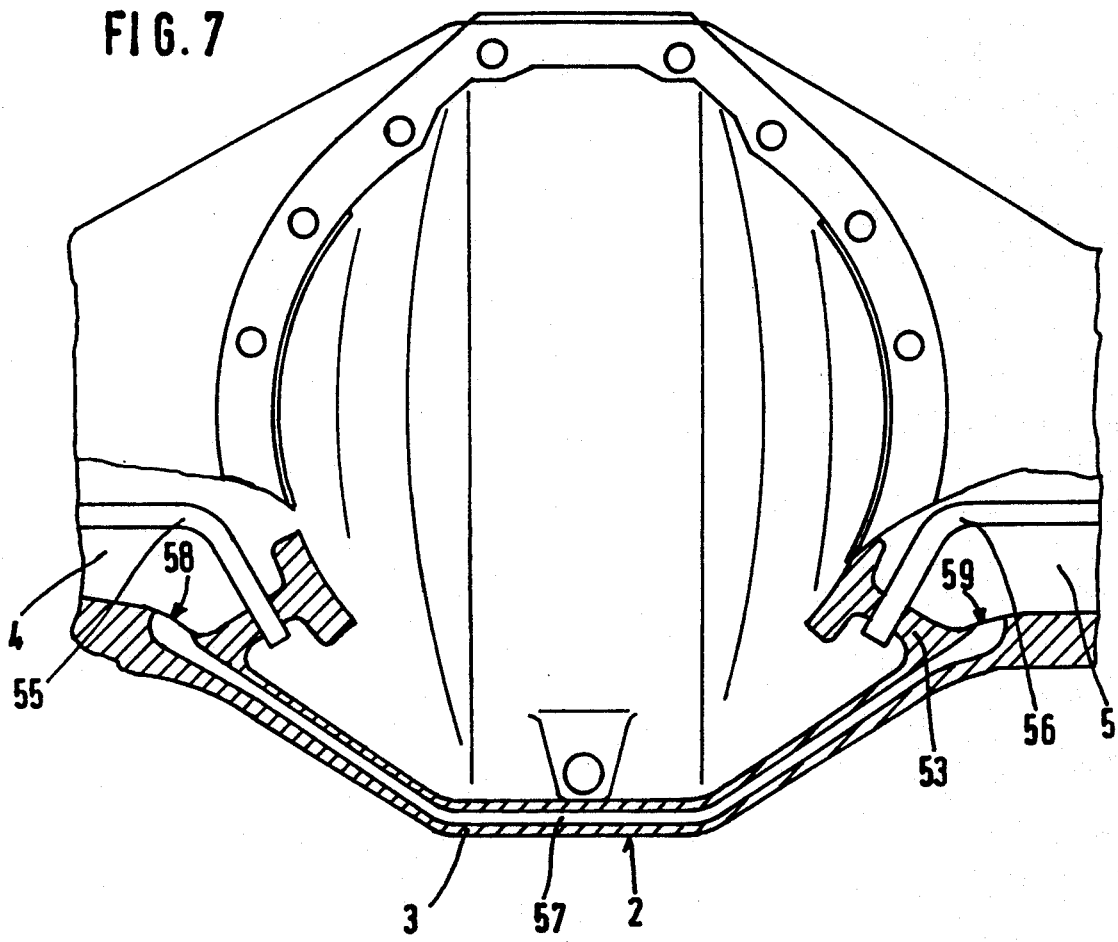

DRIVE SHAFT

The invention concerns a drive shaft having an axle body at both ends of which are fastened gear heads and in which an axle housing surrounds a differential gear which is operatively connected with a drive pinion via a bevel wheel differential and axle bevel gears and axle half shafts with wheel hubs which define gear heads, a communicating connection for the exchange of coolant exists between said wheel hubs and said axle housing.

A drive shaft of the above kind has been disclosed in U.S. Pat. No. 4,391,351. Within each gear head of said drive shaft is situated a disc brake and a planetary gear. Each disc brake is cooled with oil which from the axle housing of the differential gear runs into the gear heads via suspension pipes which are penetrated by axle half shafts. The exchange of coolant in the interior of the axle body from the axle housing to the gear heads and vice versa is absolutely insufficient in the already known design. This is essentially to be attributed only to the fact that the oil in the interior of the axle body is kept moving by the rotation of the differential gear or the bevel wheel. A noticeable circulation of the oil cannot take place, since even though the predominant portion of the oil volume is intensively centrifuged and revolved by the bevel gear and the drive pinion, it remains here stationary in the axle housing of the differential gear. The consequences of this are high planch losses and an insufficient cooling of the disc brakes.

When the drive shaft is inclined, there is finally the danger that a gear head idles so that the cooling of the disc brakes is not all together ensured.

On the basis of a drive shaft of the kind mentioned above, the problem to be solved by the invention is to improve the cooling of the disc brakes by simple measures.

The invention solves the stated problem by collection and guide elements in the area of the bevel wheel whereby during rotation of the bevel wheel coolant from the axle housing is shifted into the gear heads by lowering the coolant level. By the proposed distribution of the coolant through collection and guide elements it is ensured that a relatively larger portion of the coolant volume be available in the gear heads, that is, in the places where excessive frictional heat accumulates and has to be eliminated. The claimed design of the drive shaft according to the invention in which the disc brakes and the planetary gear are situated within each gear head—surrounded by the wheel hub—provides the conditions for admitting the predominant portion of the volume of coolant. Very low speeds already lead to the filling of the gear heads. In addition the system is insensitive to foreign bodies. With the solution proposed it is possible to maintain a coolant circuit which is characterized by added essential advantages: The lowering of the coolant level in the axle housing reduces the planch power loss. Adequate collection and guide elements can be made available at reasonable cost so that the increase in price of the drive shaft is not worth mentioning. Since the exchange of the coolant also takes place in the interior of the axle, a large surface for heat removal is available. Together with the lifting of the coolant level in the gear heads, it is possible to control very favorably the time and steady-state behavior, that is, the course per time unit of the temperature rise until reaching an upper value. This specially applies to drive shafts of heavy utility vehicles in which the disc brakes are actuated at very short time intervals—with full engine power.

There are known already other drive shafts of different design in which the disc brakes are commodated in a separate housing spatially separated from the planetary gears (for instance, European patent application 00 76 387). The disc brakes here are in the coolant circuit of a pump. The continuously delivered flow of coolant is directly speed dependent. Accordingly, the pump must have large dimensions in order to convey sufficient coolant even at low speeds, which makes the drive shaft dearer. In this design, it is particularly disadvantageous that oscillations or even brief interruptions of the coolant flow such as can be caused by foreign bodies in the coolant lead to overheating of the disc brakes.

It has proved especially favorable in tests to shift the coolant in the drive shaft in a manner such that the gear heads be filled to substantially two thirds of their volume. This specification reproduces average values such as appear when using a utility vehicle such as a wheel loader in the industrial instance "load." Here the second gear is predominantly engaged and the disc brakes are actuated about 5 to 7 times per minute. Under said service conditions, the highest temperatures of the coolant can be clearly kept below an admissible limit temperature.

In a first alternative design, the collection and guide elements are connected via pipelines with the gear heads and the gear heads are connected via the axle body with the axle housing (claim 3). In this arrangement the pipelines themselves form a component part of the guide elements.

In another alternative design the collection and guide elements are disposed and designed so as to feed the coolant to the gear heads via axle pipes of the axle body. The gear heads are then connected with the axle housing via pipelines (claim 4). To prefer one or the other solution depends primarily on the size of the axle housing and also on the length of the axle pipes of the axle body.

According to another advantageous feature of the invention, the collection and guide elements are formed by at least one trap situated on the periphery of the bevel wheel—above the coolant level in the axle housing—with an opening facing the direction of rotation of the bevel gear and being attached with a bottom to the pipelines (claim 5). The proposed trap constitutes a simple, inexpensive part. The design all together consisting of the bevel wheel that is anyway present and the trap, the same as of the attached pipelines, is sturdy, inexpensive and above all absolutely insensitive to foreign bodies carried in the coolant.

By virtue of the configuration of the trap such as further explained, especially in claims 6 to 8, the stripping and diverting effect can be optimized.

In a design where the coolant is fed to the gear heads via axle pipes, the collection and guide elements consist of substantially radically pointed strippers which project in the path of motion of the coolant drawn by the bevel wheel. Said strippers are preferably situated on the side of the bevel wheel remote from the gearing (claims 9 and 10).

The strippers collect or strip the coolant drawn from the axle housing by the bevel wheel and return it in direction to the gear heads. For this purpose they have—seen in topview—substantially the shape of quadrants which converge wedge-like in a direction toward the gear head (claim 12).

In order not to have to situate the collection and guide elements at both sides of the bevel wheel, according to another advantageous feature of the invention, the axle pipes are separated in their lower area from the axle housing and connected with each other by a duct. This step ensures that—when the collection and guide elements are situated on one side—both gear heads are supplied with coolant. The duct is preferably inserted within the housing walls of the axle body.

A simple separation of the axle pipe from the collector results by using an axle insert (claim 15).

The features proposed in claims 16 to 20 concern additional structural designs of the drive shaft according to the invention. It is specially advantageous to design the internal disc carrier of the disc brake as a conveyor gear for the coolant. For this purpose it has conveyor elements. In an advantageous embodiment, a disc brake and a planetary gear are mounted within each gear head. Such a gear head distinguishes itself by a relatively large internal volume for admission of coolant. Said volume can be additionally enlarged by each wheel hub having chambers for admitting coolant.

Other essential features and advantages resulting therefrom are to be deduced from the description that follows of two embodiments of the invention with reference to drawings. In the drawings:

FIG. 1 is a partial view of a drive shaft shown in section;

FIG. 2 to FIG. 4 shows a design and arrangement of first collection and guide elements within an axle body;

FIG. 7 shows further details of the axle body according to FIGS. 5 and 6.

Figure 6:
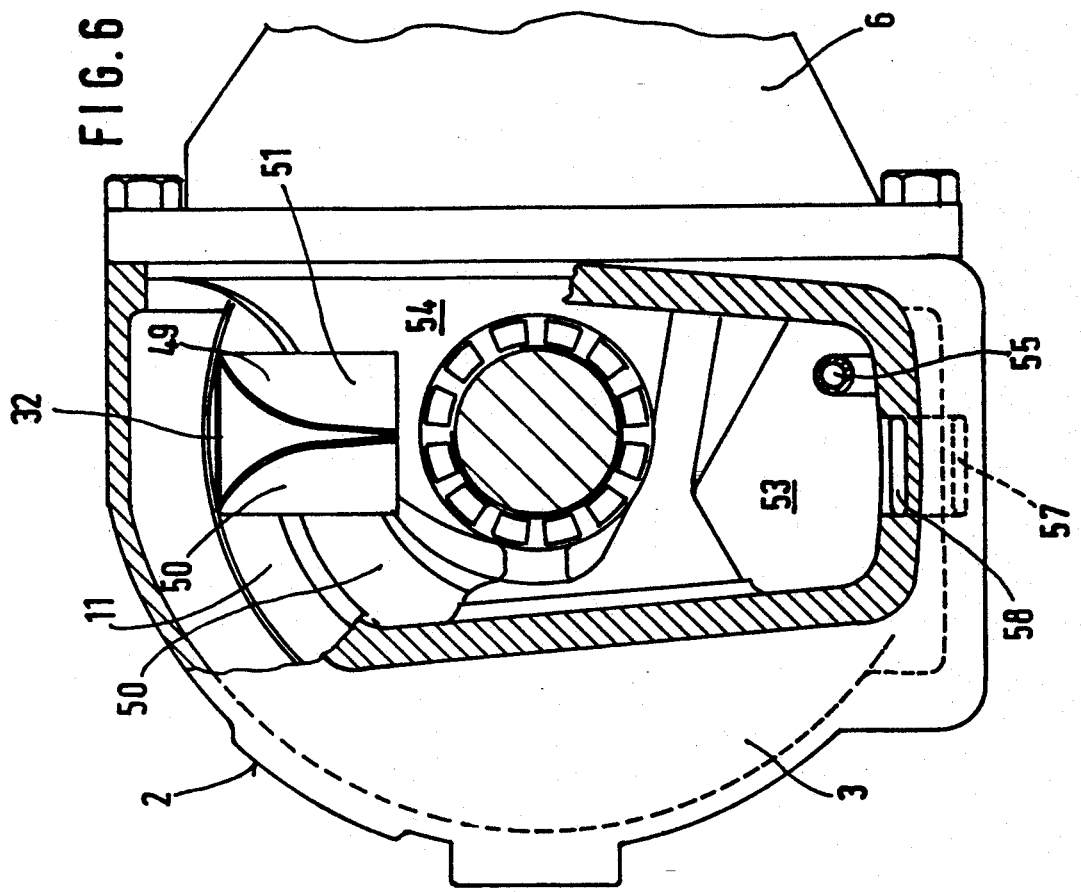
FIG. 6 is the cross section through the axle body along line VI—VI of FIG. 5.

In FIG. 1 a longitudinal cross section of a drive shaft 1 with its main parts is diagrammatically shown. The main parts of the drive shaft are the following: an axle body 2 in the central area of which axle pipes 4 and 5 join the axle housing 3 and an axle insert 6 which is centered in an opening 7 of the axle housing 3 and is firmly screwed therewith by several bolts 8. The axle pipes 4 and 5 carry gear heads 9, on their external ends, of which one gear head 9 is reproduced in the drawing.

A drive pinion 10 is rotatably supported in the axle insert 6. It is in operative connection with a bevel wheel 11. The bevel wheel 11 is part of a differential gear 12 having differential and bevel wheels. Axle half shafts 13 and 14 lead from the differential gear 12 to the gear heads 9.

The essential construction of the gear heads is described herebelow with reference to the gear head 9 appearing to the left in the drawing:

A hollow axle 15 is firmly screwed with the external end of the axle pipe 4. The axle half shaft 13 penetrates a bore 16 of the hollow axle 15 and ends in a sun gear 17 of a planetary gear 18. Between the hollow axle 15 and the planetary gear 18 is inserted a disc brake 19 hydraulically actuatable by means of a piston 20.

The disc brake 19 has internal and external brake discs 21 and 22. The internal brake discs 21 rest upon an internal disc carrier 23 non-rotatably connected with the axle half shaft 13. The disc carrier 23 is designed as conveying gear 60 with conveying elements 61.

The external brake discs 22 are supported on a hollow gear 24 of the planetary gear 18. The hollow gear 24 is held by a hollow-gear carrier 25 and non-rotatably connected with the hollow axle 15.

The planetary gear 18 is completed by several planetary gears 26 supported on a web 27 which simultaneously assumes the function of a lid. The lid is part of a wheel hub 28 rotatably supported via bearings 29 and 30 upon the hollow axle 15 or the hollow-axle carrier 25 and is outwardly sealed by means of a seal 31. The wheel hubs 28 constitutes an external limit for the gear head 9.

Collection and guide elements 32 are situated within the axle housing 3 of the axle body 2. The collection and guide elements 32 are coordinated with the bevel gear 11 and, via pipelines 33 and 34, are connected with the gear heads 9. The pipeline 33 leads here into a feedline 35 extending parallel with the axle half shaft 13 in the hollow axle 15. The feedline 35 discharges in a delivery gap 36 of the disc carrier 23 of the disc brake 19.

On the periphery of the ring gear 24 is a collector ring 37 connected with the interior of the axle pipe 4 via an outlet 38.

From the aforesaid it results that the collection and guide elements 32 are connected via pipe lines 33 and 34 with the gear heads 9 and the gear heads 9 are connected via the axle body 2 (interior of the axle pipes 4 and 5) with the axle housing 3.

The axle body 2 of the drive shaft 1 is filled with coolant for cooling the disc brakes 19. A—single—lockable filler opening 39 is used for filling. When all the rotary parts of the drive shaft are at a standstill, the coolant level 40 in the axle housing 3 reaches to the middle of the axle half shafts 13 and 14—calculated on the normal installation position of the drive shaft 1.

During operation, when driving power is transmitted to the drive gears, not shown themselves, by the drive pinion 10 via the bevel wheel 11, the differential gear 12 and the axle half shafts 13 and 14, the planetary gear 18 and the wheel hubs 28, the following shifting of the coolant occurs in the drive shaft 1.

The rotary bevel wheel 11 draws coolant from the axle housing 3 in a direction toward the collection and guide elements 32. The collection and guide elements 32 take over the coolant drawn by the bevel wheel 10 and feed it to the inner spaces of the gear heads 9 through the pipelines 33 and 34. The coolant passes through the disc brakes 19 from the inside out and skirts the planetary gear 18. The coolant is exchanged from the gear heads 9 to the axle housing 3 via the outlet 38 and the interior of the axle pipe 4 or 5 of the axle body 2.

For the rest the coolant circulates in a manner such that the coolant is shifted by the collection and guide elements 32 within the drive shaft 1. The coolant level is lowered in the axle housing 3. The coolant fed to the gear heads 9 leads, due to their being filled, to lifting the coolant level in the gear heads 9. Due to the actuation of the disc brakes 19, the temperature of the coolant circulating in the gear heads 9 rises. Since the heated coolant flows back via the interior spaces of the axle pipes 4 and 5 into the axle housing 3, a large surface is available for cooling off the coolant.

It has proved especially advantageous to design the collection and guide elements 32 in a manner such that, during the operation, a shifting of the coolant within the drive shaft appears so that about two thirds of the available interior volume of the gear heads 9 are filled with coolant. Due to the lowering of the coolant level in the axle housing 3, the planch losses can be considerably reduced in this place. On the other hand, enough coolant volume is made available and passed through within the gear heads 9 to make possible effective cooling of the disc brakes 19. All together seen, due to the shifting of the coolant, the time and steady-state behavior of the drive shaft 1 in relation to the temperature of the coolant is changed so as to make measurable a slow temperature rise and a stabilization of the coolant temperature below a maximum admissible temperature limit.

In addition, the collection and guide elements 32 stand out by their simple design. The means that serve to shift the coolant within the drive shaft 1 are operative at low speeds and insensitive to foreign bodies carried in the coolant so that the reliability of the drive shaft 1 is also fully ensured.

FIG. 2 shows in particular the view on the collection and guide elements 32 when the axle insert 6 is removed. The collection and guide elements 32 are formed by a trap 41 which, as can be also seen from FIG. 3, is situated on the periphery of the bevel wheel 11—above the coolant level 40 in the axle housing 3. The trap 41 faces, with an opening 42, the direction of rotation 43 of the bevel wheel 11. A bottom 44 communicates with the pipelines 33 and 34. The trap 41 surrounds in the manner of a saddle the bevel wheel 11 (FIG. 2 and 3). The underside 45 of the trap 41 facing the bevel wheel 11 is adapted to the external outline of the bevel wheel 11 (see also FIG. 1).

The trap 41—seen in side view of the bevel wheel 11, FIG. 3—for the rest has a funnel-shaped design. The width of the opening 42 is larger than the breadth of the bottom 44. The top side 46 of the trap 41 facing the axle body 2 is adapted to the internal outline of the axle body so that the trap 41 can be connected such as by bolts with the axle body 2 via fastening vanes 47 and suitable fastening means.

On its underside (at 48) adjacent the bevel wheel, the opening 42 of the trap 41 is oriented tangentially to the external periphery of the bevel wheel 11 (see FIG. 4).

In the above explained alternative design, collection and guide elements 32 in the form of a—single—trap 41 are used. The arrangement is such that the collection and guide elements distribute the coolant in the travel direction to be mostly found (forward travel) in a direction of the gear heads 9. Since the bevel wheel 11 draws coolant from the axle housing 3 in both directions of rotation, two traps 41 can be provided instead of a single trap 41.

Figure 5:
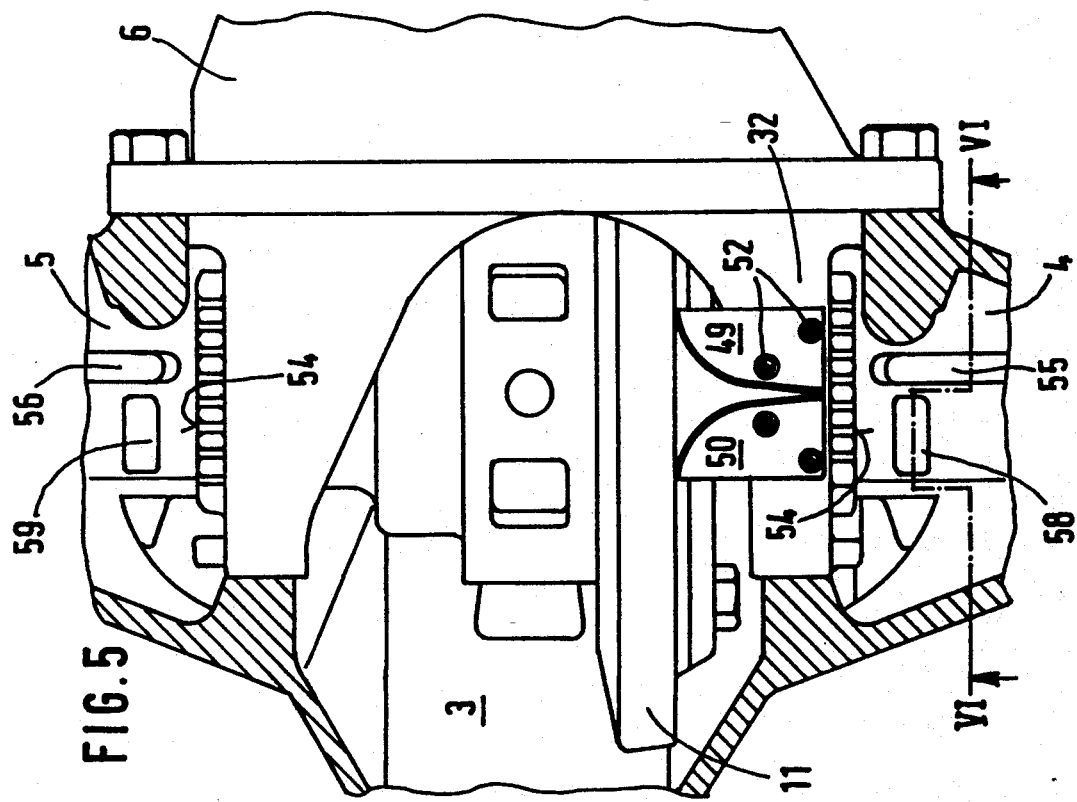
FIG. 5 is a partial view on another axle body with other collection and guide elements.

With reference to FIG. 5 to 7 another alternative design is explained in which collection and guide elements 32 are provided which, in both directions of rotation of the bevel wheel 11, strip the coolant drawn by the bevel wheel 11 from the axle housing 3. The collection and guide elements 32 consist here of substantially vertically pointed strippers 49 and 50 which are firmly connected by a bottom 51 to an assembly unit. Said assembly unit is screwed by bolts 52 (FIG. 5) on the axle insert 6.

In the alternative design described a peculiarity is to be established insofar as the axle housing 3 is partly separated from the axle pipes 4 and 5. The separation results, for instance, by webs 53 in the axle pipes 4 and 5 and/or by lateral limiting surfaces 54 of the axle insert 6.

Another difference from the design described in connection with the explanation of FIG. 1 to 4 consists, in the embodiment in question, in that the coolant flows via the internal spaces of the axle pipes 4 and 5 into the gear heads 9 (via the annular gap between the bore 16 in the hollow axle 15 and the axle half shaft 13 or 14). The coolant is here drained off from the gear heads 9 to the axle housing 3 via pipelines 55 and 56. The pipelines 55 and 56 are attached to the outlets 38 of the hollow axles 15 and discharge in the axle housing 3. In this section the pipes 55 and 56 traverse the web 53 of the axle pipes 4 and 5.

Since in the alternative design according to FIG. 5 to 7 the collection and guide elements 32 are situated on one side of the bevel wheel 11, primarily only the axle pipe 4 is in each case filled with coolant—independently of the direction of rotation of the bevel wheel 11. Therefore, care must be taken here that the coolant flows also to the interior of the axle pipe 5. For this purpose, a duct 57 is provided which is situated within the housing walls of the axle body 2 so as to connect with each other the interior spaces of the axle pipes 4 and 5 via openings 58 and 59 and for the rest it crosses below the axle housing 3. The separation of the interior of the axle housing 3 is required in order to prevent the coolant flowing to the gear heads 9 from mixing with the coolant flowing back to the axle housing 3.

REFERENCE NUMERALS 1 drive shaft
2 axle body
3 axle housing
4 axle pipe
5 axle pipe
6 axle insert
7 opening
8 bolts
9 gear heads
10 drive pinion
11 bevel wheel
12 differential gear
13 axle half shaft
14 axle half shaft
15 hollow axle
16 bore
17 sun wheel
18 planetary gear
19 disc brake
20 piston
21 internal brake discs
22 external brake discs
23 internal disc carrier
24 ring gear
25 ring-gear carrier
26 planetary gears
27 web
28 wheel hub
29 bearing
30 bearing
31 seal
32 collection and guide elements
33 pipeline
34 pipeline
35 feedline
36 delivery gap
37 collector ring
38 outlet
39 filler opening
40 coolant level
41 trap
42 opening
43 direction of rotation of the bevel wheel 11 (forward travel)

44 bottom
45 underside
46 top side
47 fastening vanes
48 underside adjacent the bevel wheel 11
49 stripper
50 stripper
51 bottom
52 bolts
53 web
54 limiting surfaces
55 pipeline
56 pipeline
57 duct
58 opening
59 opening
60 conveying gear
61 conveying elements
62 chambers

We claim:

1. A drive shaft (1) having an axle body (2) at both ends of which are fastened gear heads (9) and in which an axle housing (3) surrounds a differential gear (12) which is operatively connected with a drive pinion (10) via a bevel wheel (11), differential and bevel gears and axle half shafts (13, 14) with wheel hubs (28) which define said gear heads (9), and a communicating connection exists, between said wheel hubs (28) and said axle housing (3), for the exchange of coolant, characterized by collection and guide elements (32) in the area of said bevel wheel (11) through which, during rotation of said bevel wheel (11), coolant from said axle housing (3) is shifted into said gear heads (9) by lowering the coolant level (40).

2. A drive shaft according to claim 1, characterized by the shifting of said coolant in said drive shaft (1) in a manner such that coolant-conveying spaces of said gear heads (9) are each filled with coolant up to two thirds of their volume.

3. A drive shaft according to claim 1, characterized in that said collection and guide elements (32) are connected via pipelines (33, 34) with said gear heads (9) and said gear heads (9) are connected via said axle body (2) with said axle housing (3).

4. A drive shaft according to claim 1, characterized in that said collection and guide elements (32) feed the coolant to said gear heads (9) via axle pipes (4, 5) of said axle body (2) and said gear heads (9) are connected with said axle housing (3) via pipelines (55, 56).

5. A drive shaft according to claim 1, characterized in that said collection and guide elements (32) are formed by at least one trap (41) which is situated adjacent the periphery of said bevel wheel (11)—above the coolant level (40) in said axle housing (3)—faces with an opening the direction of rotation (43) of said bevel wheel (11) and is attached by a bottom (44) to said pipelines (33, 34).

6. A drive shaft according to claim 5, characterized in that said trap (41) surrounds in the manner of a saddle said bevel wheel (11)—seen in a direction of said bevel wheel (11)—and the underside (45) of said trap (41) facing said bevel wheel (11) is adapted to the external outline of said bevel wheel (11).

7. A drive shaft according to claim 6, characterized in that said trap (41)—seen in a side view of said bevel wheel (11)—extends in the shape of a funnel, the width of the opening (42) being larger than the breadth of said bottom (44) and the top side facing said axle body (2) is adapted to the internal outline of said axle body (2).

8. A drive shaft according to claim 5, characterized in that—seen in a side view of said bevel wheel (11)—said opening (42), on its underside (48) adjacent said bevel wheel (11), extends pointing tangentially to the external periphery of said bevel wheel (11).

9. A drive shaft according to claim 1, characterized in that said collection and guide elements (32) consist of substantially vertically pointing strippers (49, 50) which project into a path of motion of the coolant drawn by said bevel wheel (11).

10. A drive shaft according to claim 9, characterized in that said strippers (49, 50) are situated upon the side of said bevel wheel (11) remote from the gearing.

11. A drive shaft according to claim 9, characterized in that said strippers (49, 50) consist of sheet-metal strips firmly connected with a bottom (51) to form an assembly unit.

12. A drive shaft according to claim 11, characterized in that sheet-metal strips—seen in topview—combined with said bottom (51) have substantially the shape of quadrants which converge in direction toward said gear head (9).

13. A drive shaft according to claim 9, characterized in that in their lower area said axle pipes (4, 5) are separated from said axle housing (3) and connected with each other by a duct (57).

14. A drive shaft according to claim 13, characterized in that said duct (57) is inserted within the housing walls of said axle body (2)—crossing below said axle housing (3).

15. A drive shaft according to claim 13, characterized in that said axle pipes (4, 5) are partly separated from said axle housing (3) by an axle insert (6).

16. A drive shaft according to claim 3, characterized in that in the transition region said coolant is fed to said gear heads (9) in peripheral vicinity of said axle half shafts (13, 14).

17. A drive shaft according to claim 1, characterized in that said disc brake (19) has an internal disc carrier (23) for supporting internal brake discs (21) and said disc carrier (23) is designed as conveying gear (60) with a delivery gap (36) for said coolant.

18. A drive shaft according to claim 17, characterized in that said conveying gear (60) has conveying elements (61).

19. A drive shaft according to claim 1, characterized in that one disc brake (19) and one planetary gear (18) are situated within each one of said gear heads (9).

20. A drive shaft according to claim 1, characterized in that each hub wheel (28) has chambers (62) for admitting coolant.

* * * * *